W. F. SCHWEIGER.
MOTOR ACTUATING DEVICE FOR REGISTERING MACHINES.
APPLICATION FILED APR. 23, 1904.
1,047,711.
Patented Dec. 17, 1912.
7 SHEETS—SHEET 5.
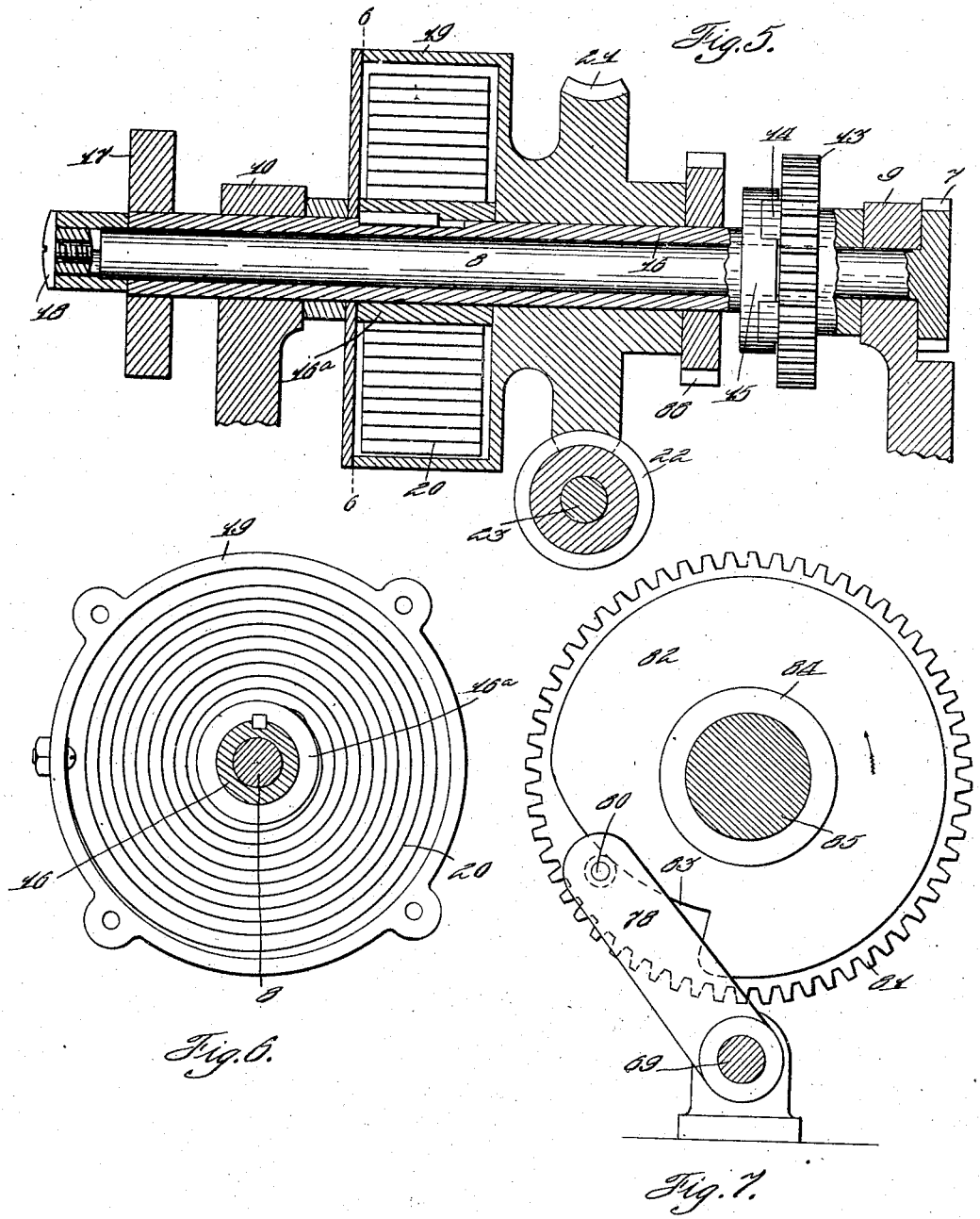

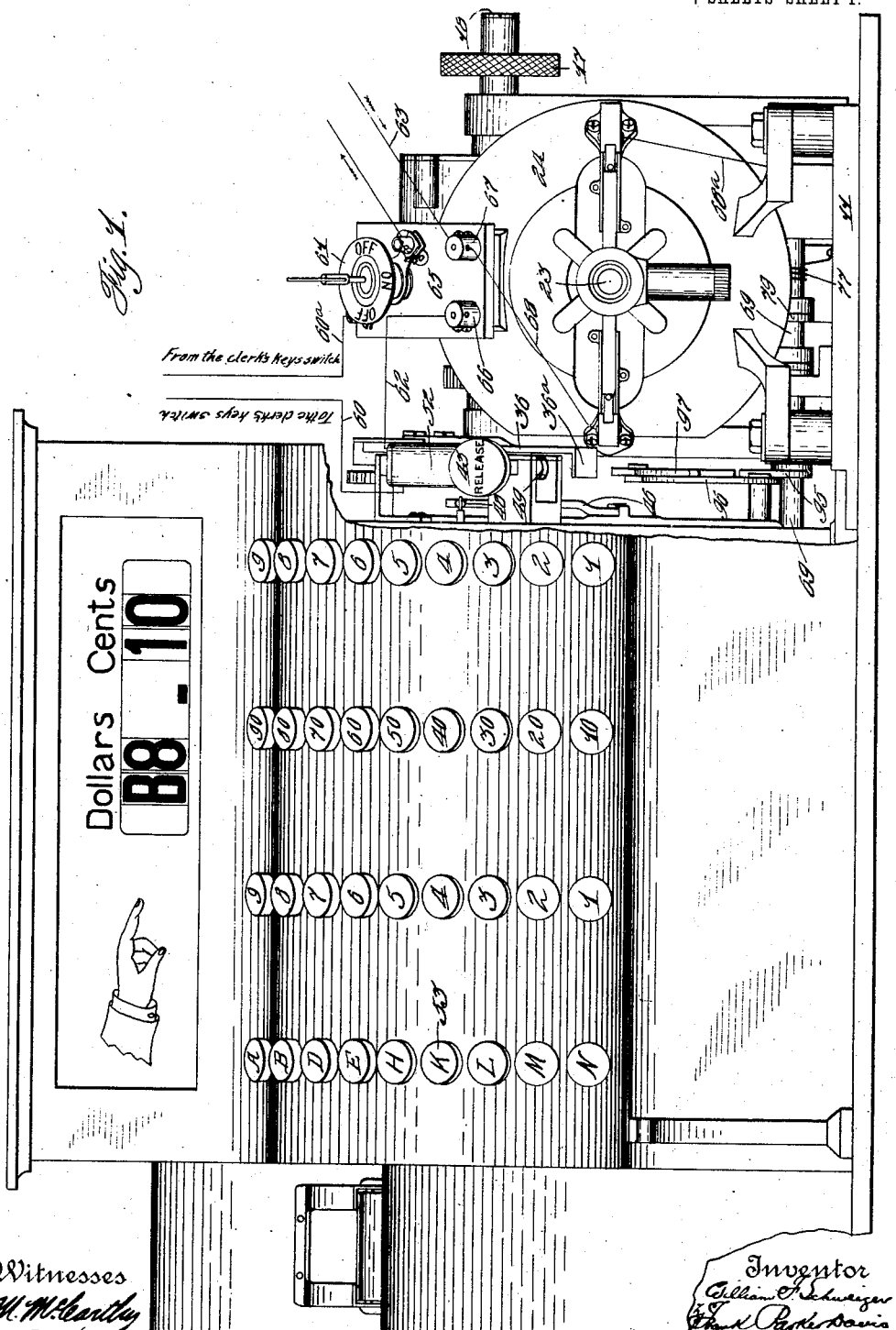

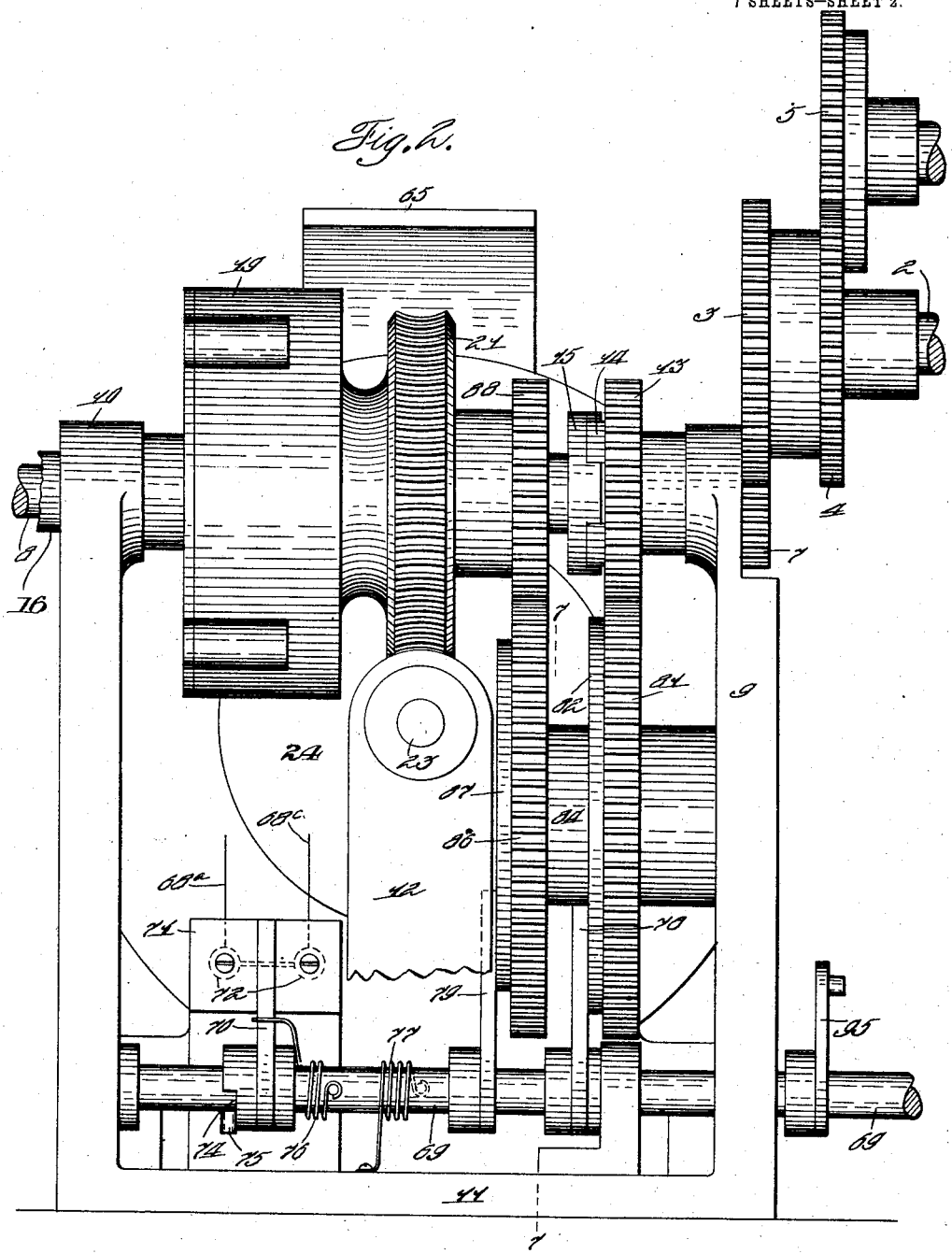

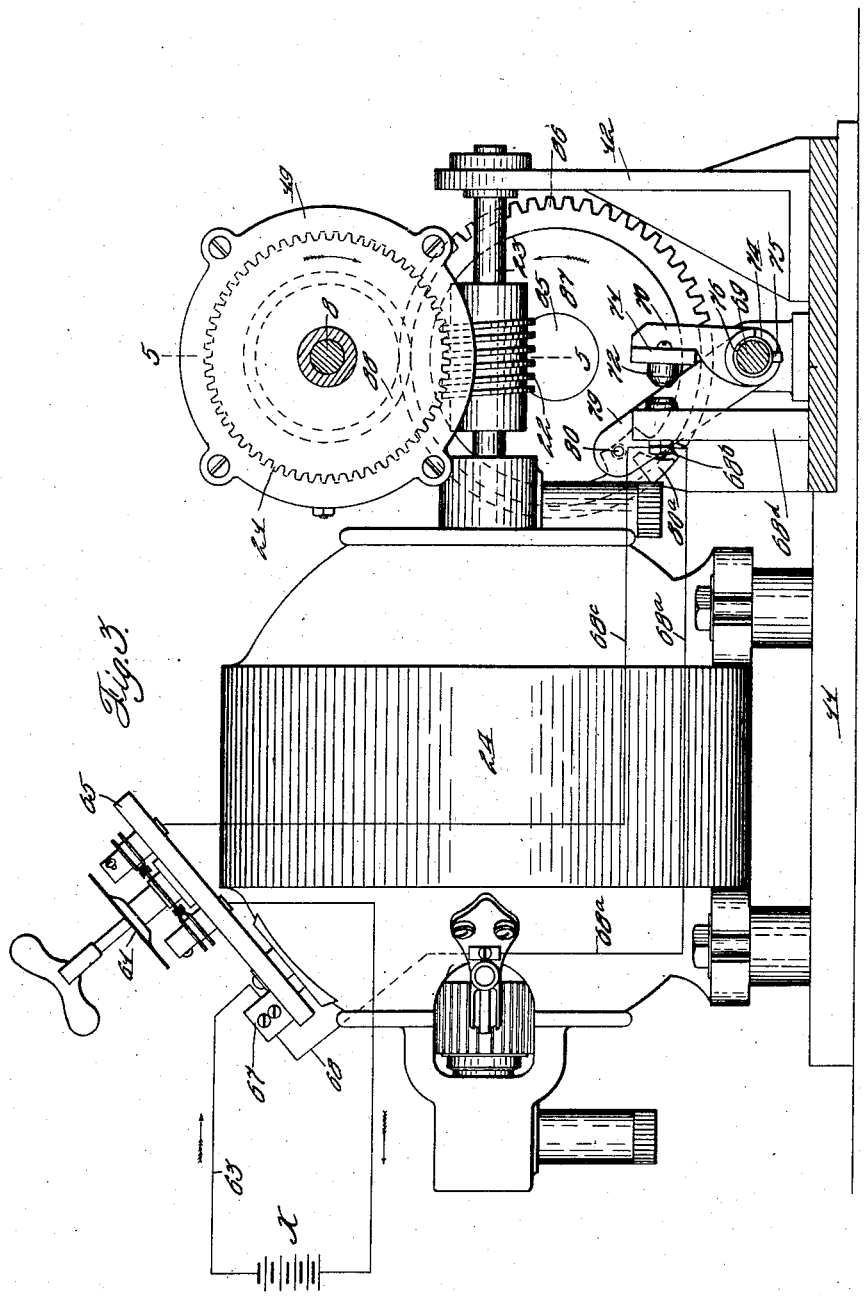

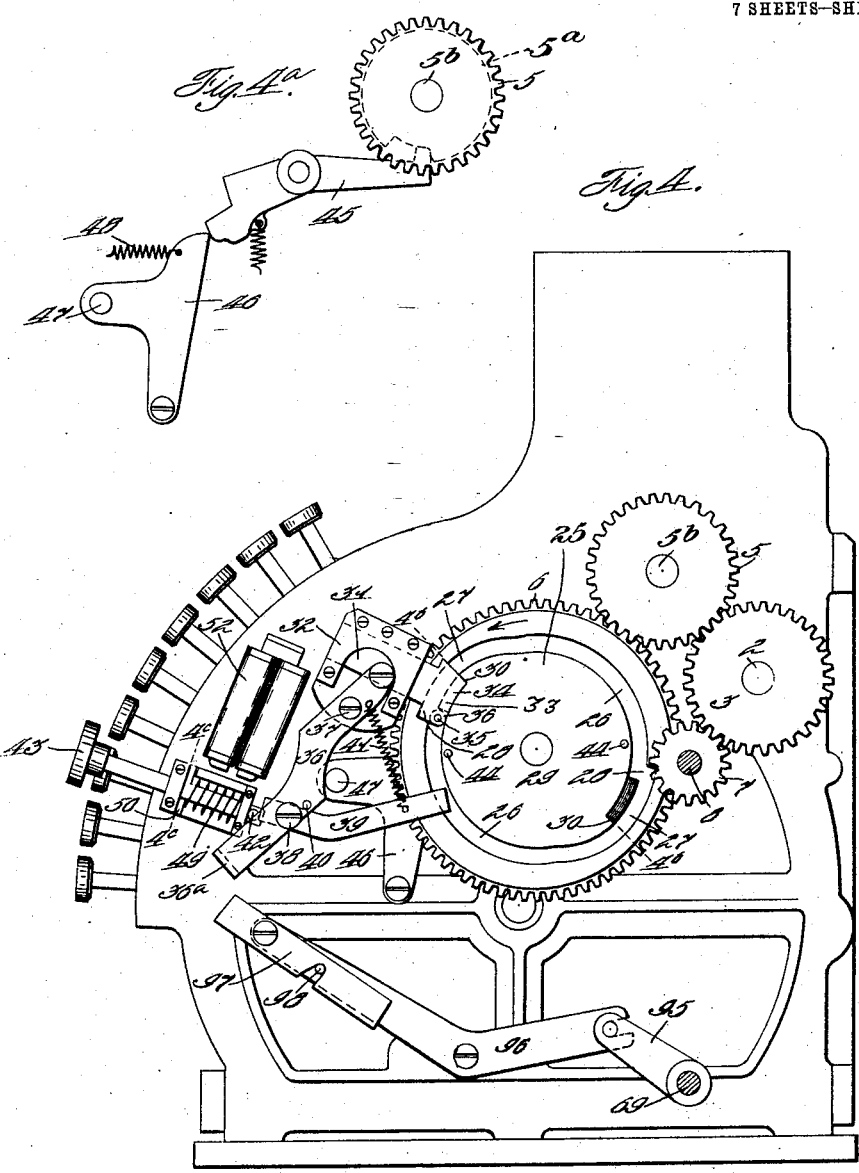

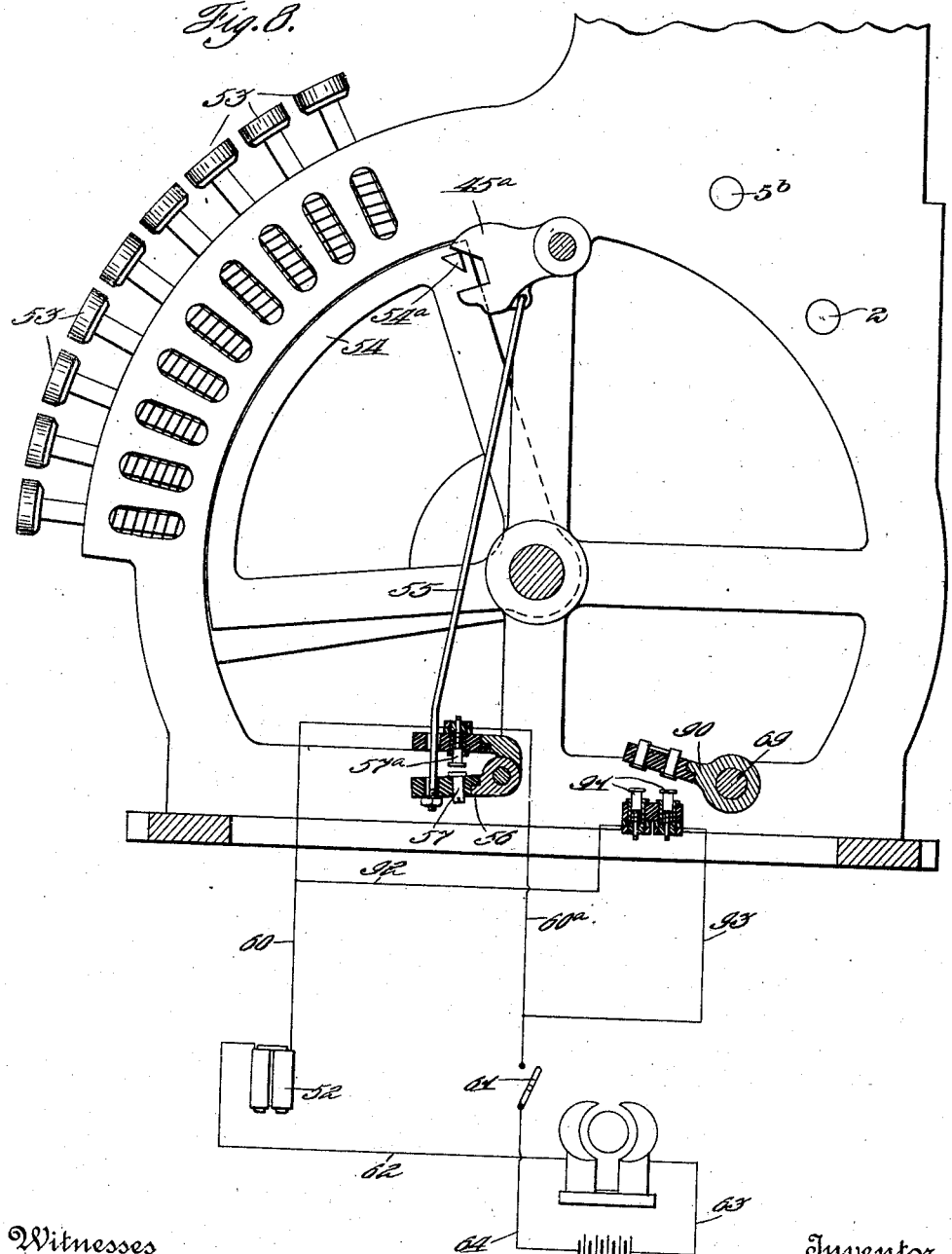

W. F. SCHWEIGER.
MOTOR ACTUATING DEVICE FOR REGISTERING MACHINES.
APPLICATION FILED APR. 23, 1904.
1,047,711.
Patented Dec. 17, 1912.
7 SHEETS—SHEET 7.
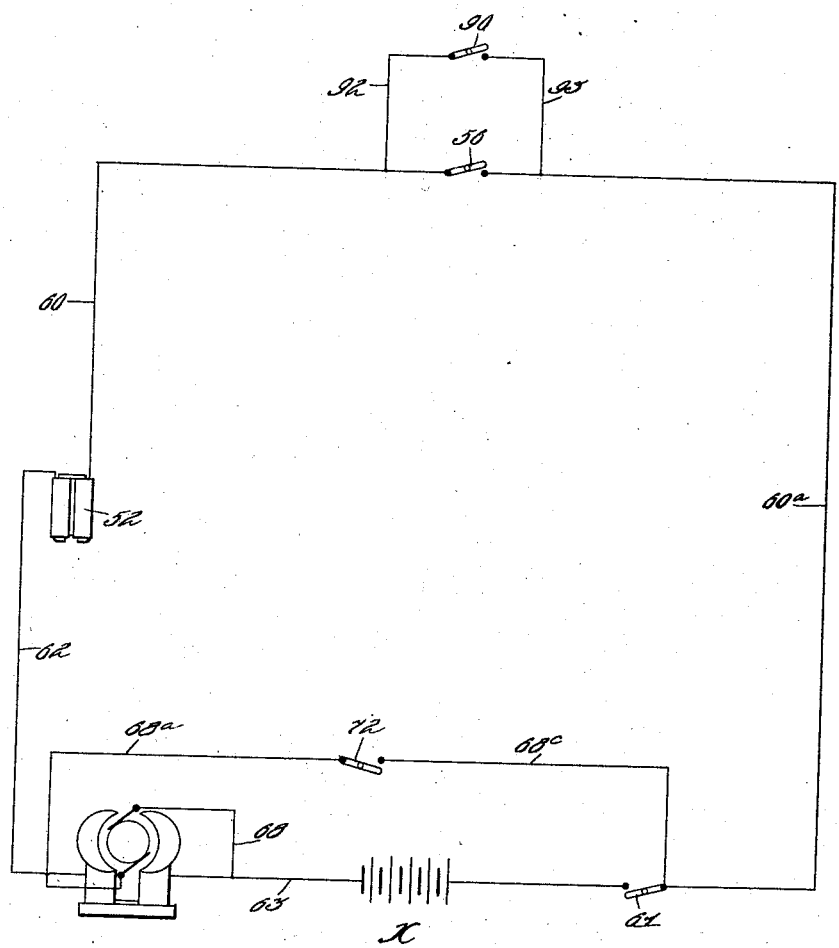

UNITED STATES PATENT OFFICE.

WILLIAM F. SCHWEIGER, OF DAYTON, OHIO, ASSIGNOR, BY MESNE ASSIGNMENTS, TO THE NATIONAL CASH REGISTER COMPANY, OF DAYTON, OHIO, A CORPORATION OF OHIO, (INCORPORATED IN 1906.)

MOTOR ACTUATING DEVICE FOR REGISTERING-MACHINES.

1,047,711.  Specification of Letters Patent.  Patented Dec. 17, 1912.

Application filed April 23, 1904. Serial No. 204,499.

*To all whom it may concern:*

Be it known that I, WILLIAM F. SCHWEIGER, a citizen of the United States, residing at Dayton, in the county of Montgomery and State of Ohio, have invented certain new and useful Improvements in Motor Actuating Devices for Registering-Machines, of which I declare the following to be a full, clear, and exact description.

This invention relates to devices for automatically operating cash register or analogous machines in place of operating them by hand as is usually done, and the invention has more particular reference to the employment of electricity as an agency for supplying power to perform the operations of the mechanism.

The objects are as follows: in general to employ an electric motor in connection with a cash register so as to produce no undue shock or strain upon the working parts of the machine; more specifically, to provide for driving the machine by spring power supplied through electromotive force and preventing (1) a release of the spring motor in the absence of an electric current; (2) a continued operation after completion of one cycle, by holding the spring motor detent displaced; (3) the release of the spring motor a second time before its power has been restored by the electric motor.

With these and incidental objects in view, the invention consists in certain novel features of construction and combinations of parts, the essential elements of which are set forth in appended claims and a preferred form of embodiment of which is hereinafter specifically described with reference to the drawings which accompany and form part of this specification.

Of said drawings: Figure 1 represents a front elevation of a cash register with the motor attachments of the present invention applied thereto, the casing or inclosure for the latter being omitted and part of the casing of the machine proper being broken away. Fig. 2 represents an enlarged rear elevation of the motor mechanism which appears at the right of Fig. 1. Fig. 3 represents a sectionalized side elevation of the same parts. Fig. 4 represents the cash register in end elevation viewed from the motor end but with the main parts of the motor attachment omitted while the controlling devices therefor appear in elevation. Fig. 4ª is a detached side elevation of certain locking devices. Fig. 4ᵇ is a cross section on line 4ᵇ of Fig. 4. Fig. 4ᶜ is a cross section on line 4ᶜ—4ᶜ of Fig. 4. Fig. 5 is an enlarged longitudinal vertical section taken on line 5—5 of Fig. 3. Fig. 6 is a section taken on the line 6—6 of Fig. 5. Fig. 7 is a section taken on the line 7—7 of Fig. 2. Fig. 8 is an outline elevation of part of the cash register together with a diagrammatic representation of certain electrical connections, and Fig. 9 is a diagram of circuits.

The particular type of cash register in connection with which the invention is illustrated in the present instance is that wherein keys are pressed in to set up the amount of the purchase and the designation of the clerk making it and then power is applied to do the registering, indicating and recording. The Patent No. 580,378 to Cleal and Reinhard, dated April 13, 1897, shows a machine of this type and reference may be had to that patent if necessary for an explanation of the mode of operation of such a cash register as illustrated in the present case. It is not at all necessary to a full understanding of the present invention to go into any detailed description of the operations of the register proper. Suffice it to say that the initial bank of keys controls a lock which must be displaced before the register can be operated at all.

The numeral 2 (Fig. 4) designates a main shaft of the cash register mechanism, by the rotation of which shaft all the operating parts of the register are driven. This shaft has fixed to it at the right-hand end spur gear-wheels 3 and 4, (Fig. 2) the latter meshing with a similar gear-wheel 5 on another shaft 5ᵇ which is part of the operating mechanism of the cash register and this last-named gear-wheel meshing with a larger gear-wheel 6 journaled upon a stub-shaft projecting from one of the side supports of the cash register. The gear-wheel 3 meshes with a pinion 7 affixed to or formed upon a shaft 8 which is supported in standards 9 and 10, the latter together with a suitable base 11 and a rear standard 12 constituting the framework of the motor attachment. It will be perceived at once that by rotation of the shaft 8, the cash register can be operated so that it will be understood that the means for automatically driving the mechanism of the cash register are applied to this shaft. The latter journals at one end in a bearing of the standard 9 and has affixed to it on the inner side of said standard a spur gear 13 carrying one part 14 of a clutch, the other part 15 of which is secured to the end of a long sleeve 16 surrounding the shaft 8 and constituting a bearing therefor when the clutch is open and the shaft is rotated by hand as may be done when necessity requires. In fact, this is the reason for providing the clutch which, being simply an emergency device, may be disregarded in considering the automatic operation of the machine for so long as the motive power is supplied to so operate the machine, the shaft 8 and the sleeve 16 work as one. The latter journals in the standard 10 and is shown in the present instance as equipped with a knurled knob 17 beyond said standard and with a screw-connection 18 beyond that for securing the sleeve and inclosed shaft together against relative longitudinal movement. Journaled upon the sleeve 16 is a cylindrical box 19 inclosing a volute spring 20 which is secured at its outer end to said box and at its inner end to a collar 16ª secured to the said sleeve as clearly shown in Fig. 6. This spring exerting power at the interior tends to turn the shaft 8 in a direction to operate the cash register, and hence in order to secure an automatic operation of the latter it is only necessary to keep the spring under tension and provide for releasing the same when an operation of the machine is desired. The spring casing is not fixed but has combined with it a worm-wheel 21 which is engaged by a worm 22 fast upon the armature shaft 23 of an electric motor 24 supported upon the base 11 forward of the standards 9 and 10. The rotation of the shaft 23 produced by an operation of the motor will be in a direction to wind up the spring 20 and hence in order to keep this spring under tension ready for supplying power to operate the cash register it is only requisite to energize the motor at the proper time and for the proper period. Assuming the spring to be under tension and the motor to be inert, it will be understood that the spring will be held in one direction by the inability of worm-wheel 21 to turn worm 22, and in the opposite direction because the cash register is normally locked against operation.

In addition to the usual lock for the cash register which is customarily released by depression of any one of the clerks' keys, there is provided a special lock for the spring motor in the nature of a detent which will be withdrawn to permit the spring to act but reëngaged to limit its action to one cycle of operation of the cash register. Combined with the gear-wheel 6 is a disk 25 having in its outer face a continuous cam-groove comprising opposite portions 26 concentric with the disk, eccentric portions 27 and short radial connecting portions 28 at diametrically opposite points. Disk 25 has a raised central portion 29 whose outline coincides with the inner wall of the cam-groove except in those portions of the latter bounding the short radial parts 28 of the groove and about half of the eccentric parts 27 thereof. The outline of this raised portion of the disk, however, partakes of the eccentricity of the cam groove and radial shoulders 30 are formed on this raised portion, which shoulders are alternately engaged by the detent to check the action of the spring. It will be of course understood from this that the gear-wheel 6 makes but a half revolution in a cycle of operation of the cash register.

The detent proper is in the form of a bolt 31 fitted to slide in a suitable keeper 32 fast to the framework of the cash register, the bolt moving radially of the disk 25 and having a head 33 which overlies the grooved portion thereof and is formed with a nose 34 to engage the shoulders 30. The inner end face of the bolt-head is curved to conform with the periphery of the central enlargement 29 of the disk 25 and a pin 35 secured through the back end of said bolt-head carries a roller 361 lying in the cam groove of the disk 25. Normally this roller occupies one of the radial portions 28 of the groove so that the bolt can be withdrawn but it will be seen that the engagement of the roller with the cam groove insures the bolt being positively returned to position for engagement with the other shoulder 30 when the disk is rotated. Among the objects of this construction is that the head 33 of bolt 31 may receive the impact of shoulders 30, thus protecting the pin 35 by means of which the bolt 31 is moved into and out of engagement.

A lever 36 is pivoted at 37 to the fixed support for the bolt-keeper 32 and at its upper end is coupled to the bolt 31 while on the opposite side of its pivot toward its lower end it has pivotally connected with it at 38 a tappet arm 39. This tappet arm is held against a pin 40 on the lever 36 by a spiral spring 41 and its front end lies directly in front of a pin 42 projecting laterally from the stem of the release key 43 with which the cash register is equipped, this key as shown in Fig. 1 being located just to the right of the units-of-cents bank of amount keys. It will be seen that the inward thrust of this release key will withdraw the bolt head 33 from engagement with the shoulder 30 by reason of the pin 42 acting against the end of the tappet arm 39 and the lever 36 being in consequence rocked on its pivot.

The purpose of having the release key act upon the pivoted tappet arm rather than directly against the lever 36 is to prevent the holding in of the release key having any effect to unduly continue the operation of the spring motor. To this end the tappet arm extends rearwardly over the face of the disk 25 and when thrust rearwardly it extends over the face of the enlarged center 29 of said disk from which at diametrically opposite points project tappet pins 44 at short distances beyond the shoulders 30. It follows that almost immediately after the release of the disk 25 when the shoulder 30 has passed the bolt 31, one of the pins 44 will strike the tappet arm 39 and disengage its forward end from the pin 42.

In order to prevent an operation of the release key until after one of the clerks' keys has been pressed in, the regular machine lock is employed to block the inward thrust of the release key. In Fig. 4ª the regular locking lever is shown at 45, its rear end normally engaging a notch in a disk 5ª combined with the gear-wheel 5. The operation of any key of the clerks' bank will displace this lever in a well known manner elevating its front end and lowering its rear end. To carry out the object here stated, a tumbler 46 is pivoted to a convenient part of the cash register frame and is formed at its upper end with a nose which normally rests against the lower front part of the lock-lever 45, said tumbler having a forwardly extending arm with a pin 47 in engagement with the rear edge of the lever 36 and held against it by a suitable spring 48. Before the release key can be pressed in therefore, it is essential that the locking lever 45 shall have freed the tumbler 46. It is also desirable that the release key shall not be operated in the absence of an electric current for operating the motor and with this in view, the following devices are employed: The stem of the release key runs through a pair of guides and a spiral spring 49 surrounds it between one of these guides and a cross pin 50 and this pin is long enough to engage a latch plate 51 which is pivoted between the guides and when free to do so falls by its own gravity in front of the pin 50. An electromagnet 52 is secured to the cash register frame with its poles over the plate 51, which is acted upon as an armature of said magnet when the latter is energized, and being lifted on its pivots, frees the pin 50 and consequently the release key. This magnet might simply be energized with the turning on of the main switch which controls the supply of current but it is preferred to interpose another switch controlled by the clerks' keys so that although the main switch is turned on no current goes through the said magnet until a clerk's key is operated. The numeral 53 designates manipulative devices such as clerks' keys and 54 their detent (Fig. 8) which has the well-known triangular lug 54ª for coaction with the jaw of an arm 45ª on the shaft of the machine lock 45. Said arm is connected by a link 55 with a hinged switch plate 56 carrying contacts 57 for engagement with superposed contacts 57ª to which are connected respectively the wires 60 and 60ª one leading to said magnet and the other to the main or "on and off" switch 61. The plate 56 is of course normally depressed so that its switch is open, but upon pushing in of a clerk's key and consequent movement of the detent 54, said switch is closed and the magnet energized provided of course that the "on and off" switch is closed. It is proposed to employ the field of the motor as resistance for the magnet circuit and in the diagram Fig. 8 the numeral 62 designates a wire running from the magnet to one side of the field, and 63 a wire running from the other side of the field to one pole of the battery X from the other pole of which a wire 64 runs to terminal of the "on and off" switch. It will be later explained how the current is sent through the armature of the motor and how the circuit through the field is maintained after clerk's key switch has opened.

It is not intended that the circuit through the motor-armature shall be made upon the pressing in of the release key but that this shall simply serve the purpose of releasing the spring motor and that the operations of the latter shall close the circuit through the motor-armature and that the maintenance of this circuit shall be controlled by the electric motor itself. The aforesaid "on and off" switch is mounted upon a fiber base 65 (Fig. 1) which also supports binding posts 66 and 67 through which the wires 62 and 63 reach the field of the motor, and one of these binding posts (67) is also connected by wire 68 with one of the motor brushes. The other brush is connected by wire 68ª with one of a pair of binding posts 68ᵇ (Fig. 3) the other one of which is connected by wire 68ᶜ with the upper terminal of the "on and off" switch. The said binding posts 68ᵇ are mounted in a fiber standard 68ᵈ and extend through the same to present contacts in rear thereof. A rock shaft 69 (Fig. 3) extends between the lower parts of the standards 9 and 10 and upon it there is journaled an arm 70 with a fiber cross head 71 carrying contacts 72 electrically united and arranged to bear against the contact ends of the binding posts 68ᵇ respectively with spring pressure. The hub of the arm 70 has a quadrant notch 74 into which projects a pin 75 of the shaft 69, the arm 70 thus being allowed a limited play upon the shaft. A spring 76 coiled around the shaft and secured thereto engages over the back edge of the arm 70 and holds it turned forward on the shaft 69 as far as the pin 75 will permit. The shaft 69 itself is forced rearwardly by a spring 77 coiled about and secured to it and also to the base 11, and said shaft has secured to it a pair of arms 78 and 79 (Figs. 2, 3 and 7) each provided with a laterally projecting roller equipped pin 80. Meshing with the pinion 13 is a gear 81 having combined with it a cam disk 82, across the edge of which the pin 80 of the arm 78 projects. The disk 82 is regular throughout the greater portion of its circumference but at one point has a comparatively deep notch 83 (Fig. 7) and when the pin 80 is in this notch, the position of the shaft 69 impelled by its spring 77 will be such as to hold the arm 70 in its rearmost position and the switch consequently open. Normally the pin 80 lies in the notch of the disk 82 and the switch is open, but upon the starting up of the spring motor the gear 81 is revolved and the edge of the disk 82 riding against the pin 80 forces the arm 78 forward and consequently rocks the shaft 69 and closes the switch. However it is not desired that the switch shall immediately open again upon the disk 82 having made a complete revolution bringing the notch 82 around to the pin again but it is intended that the opening of the switch shall be controlled by the electric motor. The gear 81 is secured to a sleeve 84 which is journaled upon a shaft 85, the latter in turn being journaled in a bearing on the standard 9 and carrying affixed to it beyond the gear 81 a similar gear 86 which has combined with it a cam disk 87 similar in outline to the cam disk 82, and co-acting with the arm 79 just as said disk 82 co-acts with the arm 78. The gear 86 meshes with a pinion 88 which is combined with the motor driven worm gear 21. The rotation of the gear 86 which accompanies the operation of the electric motor is slower than the rotation of the disk 82 produced by an operation of the spring motor and hence although the disk 82 may have made a complete revolution and the pin 80 of the arm 78 may be again opposite the notch 83, nevertheless the switch is held closed because the pin 80 of the arm 79 is still riding upon the regular part of the periphery of the disk 87. Hence, not until this disk 87 has made a complete rotation will the switch open and the operation of the electric motor cease. A cam lug 80$^a$ on disk 87 will insure the opening of the switch by acting against pin 80.

Inasmuch as the depressed clerk's key is released in the cycle of operation of the cash register and its switch consequently opened, it becomes necessary to provide an additional switch to preserve the circuit through the motor field until the switch 72 opens. Hence there is secured to the rock shaft 69 a switch piece 90 (Fig. 8) with two contacts for engagement with yielding terminals 91 of wires 92 and 93 leading from wires 60 and 60$^a$ respectively. Upon the rocking of said shaft by the spring motor this auxiliary switch is closed and of course remains closed until the shaft returns to normal position, so that the opening of switch 56 does not interrupt the operations of the motor.

The diagram in Fig. 9 clearly indicates the circuits. The resistances of field and armature of the motor are so balanced as to prevent any disastrous results from the current going through the field preliminarily to operating the release-key magnet.

In order to prevent a second operation of the release key until the electric motor has completed its work of re-winding the spring, the following devices are employed: A crank arm 95 is secured to the rock shaft 69 (Figs. 2 and 4) and a pin at its end engages the forked end of a lever 96 pivoted intermediate its ends to the main frame and carrying at its forward end an abutment bar or locking arm 97 pivoted to said lever and notched in rear of its pivot to straddle a pin 98 on the latter, there being a preponderance of weight on the rear side of the pivot. When the shaft 69 is rocked forward by the spring motor said abutment bar is carried up and its heavier rear part raised by reason of its forward arm abutting the lever 36 which has a laterally projecting end portion 36$^a$ (Fig. 1) for the purpose. Of course it will be understood that this takes place when said lever has been thrust rearwardly by the release key. When the lever 36 returns to normal position, as it does very soon after the spring motor is under way, the abutment bar 97 swings back to normal position on the lever 96 and presents its front end behind the said lateral projection 36$^a$ of lever 36 preventing inward movement of the same and consequently of the release key until the electric motor has completed its work and the rock shaft 69 has resumed normal adjustment.

To operate the machine the main switch 61 must be closed if not in its closed position, and value keys are depressed, if desired, for the purpose of controlling the operation of registering mechanism in the cash register upon operation of the driving mechanism. It is next necessary to depress one of the clerks' initial keys, thus closing the switch 56, (Figs. 8 and 9), by rocking the segment 54 upwardly which through its pin 54$^a$ rocks arm 45$^a$ upward and thereby draws contact 57 into engagement with contact 57$^a$. By this means the circuit, composed of wires 60$^a$, 60, 62 and 63, passing through the coils of magnet 52 and the field coils of motor 24, is closed. The magnet 52 thereupon draws its armature latch 51, (Fig. 4$^c$), out of the path of pin 50 on the release key 43, which may now be depressed, and, in order to release the spring motor 19 and to close the armature circuit of the electric motor 24, the release key is depressed, thus withdrawing the bolt or detent 31, (Fig. 4), from the shoulder of disk 29 permitting rotation, under the action of the spring motor, of the train of driving gears and shafts by which the cash register is operated. Shaft 8, which is one of the shafts driven by the spring motor, through its gear 13, (Fig. 2), drives the gear 81 fast with cam 82. Cam 82, (Fig. 7), serves to rock the shaft 69 by engagement with roller 80 of arm 78 and thus closes switch 72, (Figs. 3 and 9), making a circuit through the motor armature by means of wires 68, 68ª, 68ᶜ, which connect with the source of supply "x." The operation of motor 24, by the worm 22, (Fig. 5), rotates worm wheel 21 integral with the cylinder 19 to which one end of spring 20 is fastened, thereby rewinding the spring. Rotation of the worm wheel 21 also serves to rotate the gear 88 fastened thereto and meshing with gear 86 to which is secured the cam 87. The cam 87 which is thus rotated is similar to cam 82, (Fig. 7), and by coacting with the roller on arm 79 fast to shaft 69 prevents return rocking of the shaft, and thereby the opening of switch 72 until the motor is operated enough to effect the complete rotation of cam 87, and consequently rewind spring 20. In order that cam 87 may make a complete rotation it is necessary for the worm wheel to make two rotations, as gear 88 is but half the diameter of gear 86. The two rotations of worm wheel 21 serve to rewind the spring 20 the exact amount which it is unwound when released. Cam groove 27, (Fig. 4), by acting on roller 361 on bolt 31 serves to draw the bolt into position to stop the operating mechanism of the cash register. Latch 45, (Fig. 4ª), springs into latching position when the cut away part of cam 5ª arrives opposite the end of the latch and the machine is again in condition for another operation. The complete operation of the machine should be sufficiently apparent without further elucidation.

While the construction shown is well calculated to thoroughly fulfil the objects primarily stated it is to be understood that the invention is capable of being carried out in many other ways.

Having thus described my invention, what I claim as new and desire to secure by Letters Patent is:

1. In a machine of the character described, the combination with the operating mechanism; of a spring motor connected therewith; a detent normally restraining said motor; an electric motor connected with the spring motor for restoring tension therein; a switch controlling said electric motor; means operated by the spring motor for closing the switch; and means operated by the electric motor for opening the switch, said latter means timed to prolong the operation of the electric motor beyond that of the spring motor.

2. In a machine of the character described, the combination with the operating mechanism; of a spring motor connected therewith; a detent normally restraining said motor; an electric motor connected with the spring motor for restoring tension therein; a switch controlling said electric motor and mounted on a rock shaft carrying a pair of arms; a notched disk coacting with one of said arms and geared to the spring motor; and a similar disk coacting with the other of said arms and geared to the electric motor.

3. In a machine of the character described, the combination with the operating mechanism; of a spring motor connected therewith; a detent normally restraining said motor; an electrically controlled lock for said detent; an electric motor connected with the spring motor for restoring tension therein; and automatic switch mechanism for controlling the said electric motor.

4. In a machine of the character described, the combination with the operating mechanism and a manipulative device; of a spring motor connected with said operating mechanism; a detent normally restraining said motor; an electrically operated lock for said detent controlled by said manipulative device; an electric motor connected with the spring motor for re-winding the same; and automatic switch devices for controlling said electric motor.

5. In a machine of the character described, the combination with the operating mechanism; of a spring motor connected therewith; a releasable detent normally restraining said motor; an electric motor connected with the spring motor for restoring tension therein; a switch controlling said electric motor; means operated by the spring motor for closing the switch; means operated by the electric motor for opening the switch, said latter means timed to prolong the operation of the electric motor beyond that of the spring motor; and means for preventing a second releasing operation of the detent until the switch has been opened.

6. In a machine of the character described, the combination with the operating mechanism; of a spring motor connected therewith; a releasable detent normally restraining said motor; an electric motor connected with the spring motor for restoring tension therein; a switch controlling said electric motor and mounted on a rock shaft carrying a pair of arms; a notched disk coacting with one of said arms and geared to the spring motor; a similar disk coacting with another of said arms and geared to the electric motor; and means connected with said switch rock shaft for preventing a second releasing operation of the detent until the switch has been opened.

7. In a machine of the character described, the combination with an operating mechanism; of a spring motor connected therewith to drive the operating mechanism; an electric motor for winding up the spring motor; a shouldered disk in gear with the spring motor; a detent engaging said disk to restrain the spring motor; a locking arm normally out of the path of the detent; a motor switch connected with said arm; means operated by the spring motor for closing the switch to energize the electric motor; and means operated by the latter motor for opening said switch.

8. In a machine of the character described, the combination with the operating mechanism and a manipulative device; of a spring motor connected with said operating mechanism; a detent normally restraining said motor; an electric motor; an electromagnet in a circuit embracing the motor field; a switch in said circuit controlled by the said manipulative device; an armature for said electromagnet constituting a lock for the spring motor detent; and automatic switches operated by the spring motor to close circuits separately through the motor field and armature and controlled as to opening by the electric motor itself.

9. In a machine of the character described, the combination with an operating mechanism; of a spring motor connected therewith; a detent normally restraining said spring motor; means controlled by the said spring motor for restoring the detent to obstructing position; an electric motor connected with the spring motor for restoring the latter to its initial tension; a motor circuit; and means for automatically breaking said motor circuit when the electric motor has been operated sufficiently to effect the restoration of the spring motor to its initial state of tension.

10. In a machine of the character described, the combination with an operating mechanism; of a spring motor connected therewith; a detent normally restraining said spring motor; means controlled by the said spring motor for restoring the detent to obstructing position; an electric motor connected with the spring motor for restoring the latter to its initial tension; a switch controlling said electric motor; means operated by the spring motor for closing said switch; and means operated by the electric motor for automatically opening the switch as soon as the spring motor has been restored to its initial state of tension.

11. In a machine of the character described, the combination with an operating mechanism; of a spring motor connected therewith; a detent normally restraining said motor, with means for causing the detent to reëngage the motor after a complete operation of the operating mechanism by the same; an electric motor connected with the spring motor for restoring the latter to its initial state of tension; a switch controlling said electric motor; means operated by the spring motor for closing the switch; and means operated by the electric motor for automatically opening the switch after the spring motor has caused a complete operation of the operating mechanism and the electric motor has restored the spring motor to its initial state of tension.

12. In a machine of the character described, the combination with an operating mechanism, of a spring motor connected therewith; a detent normally restraining said motor; a releasing device for operating said detent to release the spring motor, means causing the detent to reëngage and restrain said motor at the end of one complete operation of the operating mechanism; an electric motor connected with the spring motor for restoring tension therein; a switch controlling said electric motor; means operated by the spring motor for closing the switch; means operated by the electric motor for opening the switch as soon as the spring motor has been restored to its initial tension; and means for preventing a second operation of said releasing device until the motor has operated to open the switch.

13. In a machine of the character described, the combination with an operating mechanism; of a spring motor connected therewith; a detent normally restraining said motor; an electric motor connected with the spring motor for restoring tension therein; an electric circuit including said electric motor; and means for preventing the release of said spring motor unless the circuit through the electric motor is closed.

14. In a machine of the character described, the combination with an operating mechanism, of a spring motor connected therewith; a detent normally restraining said motor; a releasing means for said detent; an electric motor connected with the spring motor for restoring tension therein; a circuit including said electric motor; and means controlled by said electric motor circuit for controlling said releasing means.

15. In a machine of the character described, the combination with an operating mechanism, of a spring motor connected therewith for operating the same; means for restoring tension in the spring motor after operation; and means for preventing the operation of the spring motor unless the said tension restoring means is operative.

16. In a machine of the character described, the combination with an operating mechanism, of a spring motor connected thereto for driving the same, detents for the operating mechanism and the spring-motor, an electric motor for rewinding the spring, and means preventing the release of the spring-motor detent until the detent for the operating mechanism is released.

17. In a machine of the character described, the combination with an operating mechanism, of a spring-motor for driving the same, an electric motor for rewinding the spring, a manipulative device, a circuit including the electric motor, closed by the said device, and a shunt closed by the operating mechanism to maintain the circuit closed through the motor.

18. In a machine of the character described, the combination with an operating mechanism, of a spring motor for driving the same, an electric motor for rewinding the spring, a circuit including said motor, means normally restraining the spring motor, means for moving the said restraining means to inoperative position, and a lock for said latter means controlled by the electrical condition of said circuit.

19. In a machine of the character described, the combination with an operating mechanism, of a spring motor for driving same, an electric motor for rewinding said spring motor, a detent for said spring motor, a manipulative device for releasing said detent constructed to allow the same to be automatically restored to locking position, and an electrically controlled lock for the manipulative device in the circuit for the electric motor.

20. In a machine of the character described, the combination with an operating mechanism, of a spring motor for driving same, an electric motor for rewinding said spring, a circuit including said motor, a device for controlling said circuit, a detent for said motor, means for releasing said detent constructed to allow same to automatically return to locking position, and an electrically controlled lock for said releasing means in said motor circuit.

21. In a machine of the character described, the combination with an operating mechanism, of a spring motor for driving same, an electric motor including a circuit for rewinding said spring, a device for partially closing said motor circuit, a detent for said spring motor and means for releasing said detent, and thereby effecting a complete closing of said circuit.

22. In a machine of the class described, the combination with a driven mechanism, and a detent normally holding same against movement, of a device having potential energy for driving said mechanism, a manipulative device and a lock for said detent operated thereby, a motor for storing potential energy in said potential device, and devices for automatically controlling said motor from said energy device.

23. The combination with a spring motor, of an element operated thereby, holding means normally restraining said element from rotation, an electric winding motor having a circuit, means for effecting withdrawal of said holding means to permit rotation of said element under the action of the spring motor, means for automatically moving said holding means again into position to restrain said element from rotation, and circuit controlling means operated by the power of the spring motor whereby the winding motor is set in operation after said spring motor has operated for a predetermined period.

24. The combination with a spring motor, of an element operated thereby, means for normally holding said element against rotation, an electric winding motor having a circuit means for effecting release of said element to permit rotation thereof, and circuit controlling means operated by the power of the spring motor to close the circuit after the spring motor has operated said element for a predetermined period.

25. The combination with a spring motor, of an element operated thereby, a stop whereby rotation of said element may be restrained, means for retracting said stop and maintaining it in a retracted position for a predetermined period to permit rotation of said element for a predetermined period, an electric winding motor having a circuit, and circuit controlling means operated by the power of the spring motor to close the circuit after the spring motor has operated said element for a predetermined period.

26. The combination with a spring motor, of an element operated thereby, a stop whereby rotation of said element may be restrained, means for retracting said stop and maintaining it in a retracted position for a predetermined period to permit rotation of said element for a predetermined period, means for causing the stop to resume its position for restraining said element, an electric winding motor, and circuit controlling means operated by the power of the spring motor to close the circuit after the spring motor has operated said element for a predetermined period.

27. The combination with a spring motor, of a stop device for normally preventing operation of the spring motor, an electric motor for rewinding the spring motor, means for retracting said stop device to permit the spring motor to operate, means controlled by the movement of a part actuated by the spring motor for closing the circuit to the electric motor after a predetermined operation of the spring motor, and means for automatically moving said stop device again into operative position.

28. The combination with a motor, of a stop device for normally preventing operation of said motor, a second motor for storing power in the first said motor, means for retracting the stop device to permit the first motor to operate, means controlled by the movement of a part actuated by the first motor for causing power to be stored in said motor by the second motor after a predetermined operation of the first motor, and means for automatically returning the stop device to operative position.

29. The combination with a spring motor, of a stop device for normally preventing operation of the spring motor, an electric motor for rewinding the spring motor, means for retracting the stop device to permit the spring motor to operate and for maintaining it in a retracted position, means controlled by the movement of a part actuated by the spring motor for closing the circuit to the electric motor after a predetermined operation of the spring motor, and means for automatically returning the stop device to operative position.

30. The combination with a spring motor, of a stop device for normally preventing operation of the spring motor, a second motor for rewinding the spring motor, means for retracting the stop device to permit the spring motor to operate, means controlled by the movement of a part actuated by the spring motor for causing the spring motor to be rewound by the second motor after a predetermined operation of the spring motor, and means for returning the stop device to operative position after the spring motor has made such predetermined operation.

31. The combination with a spring motor, of stopping means for the spring motor, a second motor, and connections for rewinding the spring motor and for effecting the operation of said stopping means, means controlled by the movement of a part actuated by the spring motor for starting the second motor after a predetermined operation of the spring motor, and means for automatically stopping the second motor after a predetermined operation thereof.

In testimony whereof I affix my signature in the presence of two witnesses.

WILLIAM F. SCHWEIGER.

Witnesses:
J. B. HAYWARD,
WILLIAM O. HENDERSON.

---

Copies of this patent may be obtained for five cents each, by addressing the "Commissioner of Patents, Washington, D. C."